(12) United States Patent
Parker

(10) Patent No.: US 10,322,735 B2
(45) Date of Patent: Jun. 18, 2019

(54) COLLAPSIBLE PERSONAL TROLLEY

(71) Applicant: Eric G. Parker, Naples, FL (US)

(72) Inventor: Eric G. Parker, Naples, FL (US)

(*) Notice: Subject to any disclaimer, the term of this patent is extended or adjusted under 35 U.S.C. 154(b) by 0 days.

(21) Appl. No.: 15/925,142

(22) Filed: Mar. 19, 2018

(65) Prior Publication Data
US 2018/0265108 A1   Sep. 20, 2018

Related U.S. Application Data

(60) Provisional application No. 62/472,740, filed on Mar. 17, 2017.

(51) Int. Cl.
*B62B 1/12* (2006.01)
*B62B 5/00* (2006.01)

(52) U.S. Cl.
CPC .............. *B62B 1/12* (2013.01); *B62B 5/0083* (2013.01); *B62B 2202/65* (2013.01); *B62B 2205/33* (2013.01); *B62B 2301/05* (2013.01); *B62B 2501/062* (2013.01); *B62B 2501/065* (2013.01); *B62B 2501/067* (2013.01)

(58) Field of Classification Search
CPC ..... B62B 1/12; B62B 5/0083; B62B 2202/65; B62B 2205/33; B62B 2205/12; B62B 2501/062; B62B 2501/065; B62B 2501/067; B62B 3/1464
See application file for complete search history.

(56) References Cited

U.S. PATENT DOCUMENTS

| | | | | | |
|---|---|---|---|---|---|
| 2,564,939 | A | * | 8/1951 | Weast | B62B 1/12 280/42 |
| 2,868,557 | A | * | 1/1959 | Klipp | A45C 13/385 280/14 |
| 3,092,395 | A | * | 6/1963 | Mitty | B62B 1/12 280/14 |
| 3,241,852 | A | * | 3/1966 | Muller | B62B 1/12 211/150 |
| 3,279,811 | A | * | 10/1966 | Mitty | B62B 1/12 280/47.26 |

(Continued)

FOREIGN PATENT DOCUMENTS

| | | | | |
|---|---|---|---|---|
| DE | 102004018216 | A1 * | 11/2005 | ............... B60R 5/04 |
| FR | 2741852 | A1 * | 6/1997 | ............... B62B 1/12 |

(Continued)

*Primary Examiner* — Katy M Ebner
(74) *Attorney, Agent, or Firm* — Cook Alex Ltd.; R. Blake Johnston

(57) ABSTRACT

A collapsible trolley includes a body having a back panel, a shelf panel pivotally attached to a bottom edge of the back panel, a pair of back wing panels pivotally attached one each to opposing side edges of the back panel, a pair of shelf wing panels pivotally attached one each to opposing side edges of the shelf panel and one each to bottom edges of the pair of shelf wing panels. The body is movable between an unfolded use configuration and a folded storage configuration. A latching member is attached to the body and adapted to secure the body in the folded storage configuration. A pair of wheels is attached to the pair of back wing panels by brackets that trap the wheels between vertical abutment portions and the back wing panels, and the back wing panels have arcuate openings that align with the edge rims of the pair of wheels.

20 Claims, 11 Drawing Sheets

(56) References Cited

U.S. PATENT DOCUMENTS

| | | | | | |
|---|---|---|---|---|---|
| 3,285,620 | A | * | 11/1966 | Mitty | A45C 13/385 |
| | | | | | 280/47.26 |
| 3,292,942 | A | * | 12/1966 | Mitty | A45C 13/385 |
| | | | | | 229/117.16 |
| 3,427,040 | A | * | 2/1969 | Jenkins | B62B 5/0083 |
| | | | | | 229/117.05 |
| 3,462,171 | A | * | 8/1969 | Mitty | B62B 1/12 |
| | | | | | 280/37 |
| 3,659,867 | A | * | 5/1972 | Curry | B62B 1/12 |
| | | | | | 280/40 |
| 4,460,189 | A | * | 7/1984 | Goff | B62B 1/12 |
| | | | | | 280/47.27 |
| 5,125,675 | A | * | 6/1992 | Engelbrecht | B62B 1/12 |
| | | | | | 229/164 |
| 5,465,987 | A | * | 11/1995 | DellaVecchia | B62B 1/12 |
| | | | | | 280/47.18 |
| 6,547,263 | B1 | * | 4/2003 | McGeorge | B62B 1/12 |
| | | | | | 229/101.2 |
| 6,955,365 | B2 | * | 10/2005 | Giampavolo | B62B 1/12 |
| | | | | | 229/117.09 |
| 9,566,991 | B2 | * | 2/2017 | Parker | B62B 1/12 |
| 2003/0034636 | A1 | * | 2/2003 | Ng | A45C 5/14 |
| | | | | | 280/652 |
| 2018/0168369 | A1 | * | 6/2018 | Goldmeier | A47F 5/116 |

FOREIGN PATENT DOCUMENTS

| | | | | |
|---|---|---|---|---|
| WO | WO-2007041770 | A1 * | 4/2007 | A45C 3/04 |
| WO | WO-2014066932 | A1 * | 5/2014 | B62B 1/12 |
| WO | WO-2006131310 | A1 * | 12/2016 | B62B 5/0083 |

* cited by examiner

US 10,322,735 B2

COLLAPSIBLE PERSONAL TROLLEY

CLAIM OF PRIORITY

This application claims the benefit of U.S. Provisional Application No. 62/472,740, filed Mar. 17, 2017, the contents of which are hereby incorporated by reference.

FIELD OF THE INVENTION

The present invention relates generally to carts for groceries and other retail items and, more particularly, to a collapsible personal trolley.

BACKGROUND

Shoppers in retail stores typically use shopping carts or baskets owned by the store to hold their purchases as they travel through the store. Purchases are typically bagged at the check out counter and either reloaded into the cart or the bags themselves are carried out of the store by the shopper. Carrying the bags is cumbersome for the shopper and the number of bags that a shopper can carry is limited by the strength of his or her arms. With regard to using shopping carts outside of the store, such an arrangement does not work for city shoppers who walk to and from the store. In addition, even if the shopper drives to the store, and carries the groceries to his or her car with a store-owned cart, the store must go to the trouble of collecting the carts from the parking lot. In addition, the carts must be maintained, repaired and stored, which can add up to significant costs and take up valuable storage space.

Consumer-owned folding wire carts for use in shopping are known. The shopper brings the cart to the store, opens/unfolds it, and uses it to hold items during shopping. The shopper then uses the same cart after checkout to transport the purchases to his or her car or home. The disadvantage of such carts, however, is that they can be heavy due to the metal wire construction. In addition, they tend to feature a very utilitarian appearance. They also typically do not fold completely flat, and thus take up valuable space which is undesirable (especially when the shopper is an apartment dweller).

In view of the above, a need exists for a collapsible personal trolley that is inexpensive, lightweight, durable and attractive.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a collapsible personal trolley includes a body having a back panel including a hitchhiker tab, a shelf panel pivotally attached to a bottom edge of the back panel, a pair of back wing panels pivotally attached one each to opposing side edges of the back panel and a pair of shelf wing panels pivotally attached one each to opposing side edges of the shelf panel and one each to bottom edges of the pair of shelf wing panels. The body is movable between an unfolded use configuration, where the pair of back wing panels, pair of shelf wing panels and the shelf panel are all generally at an angle of approximately 90° with respect to the back panel so that the pair of back wing panels and the pair of shelf wing panels cooperate to support the shelf panel, and a folded storage configuration where the pair of back wing panels are generally in the same plane as the back panel, the pair of shelf wing panels are generally in the same plane as the shelf panel, the shelf panel overlays a portion of the back panel and the shelf wing panels overlay portions of the back wing panels. A latching member is attached to the body and adapted to secure the body in the folded storage configuration. A first wheel has an edge rim. A first wheel bracket is attached to a first one of the pair of back wing panels and has a generally vertical abutment portion sized to traverse a radius of the first wheel so that the first wheel is trapped between the first back wing panel and the vertical abutment portion of the first wheel bracket. The first back wing panel has an arcuate a series of openings that align with an edge rim of the first wheel. A second wheel has an edge rim and a second wheel bracket is attached to a second one of the pair of back wing panels and has a generally vertical abutment portion sized to traverse a radius of the second wheel so that the second wheel is trapped between the second back wing panel and the vertical abutment portion of the second wheel bracket. The second back wing panel has an arcuate a series of openings that align with an edge rim of the second wheel.

DETAILED DESCRIPTION OF EMBODIMENTS

Figure 1:
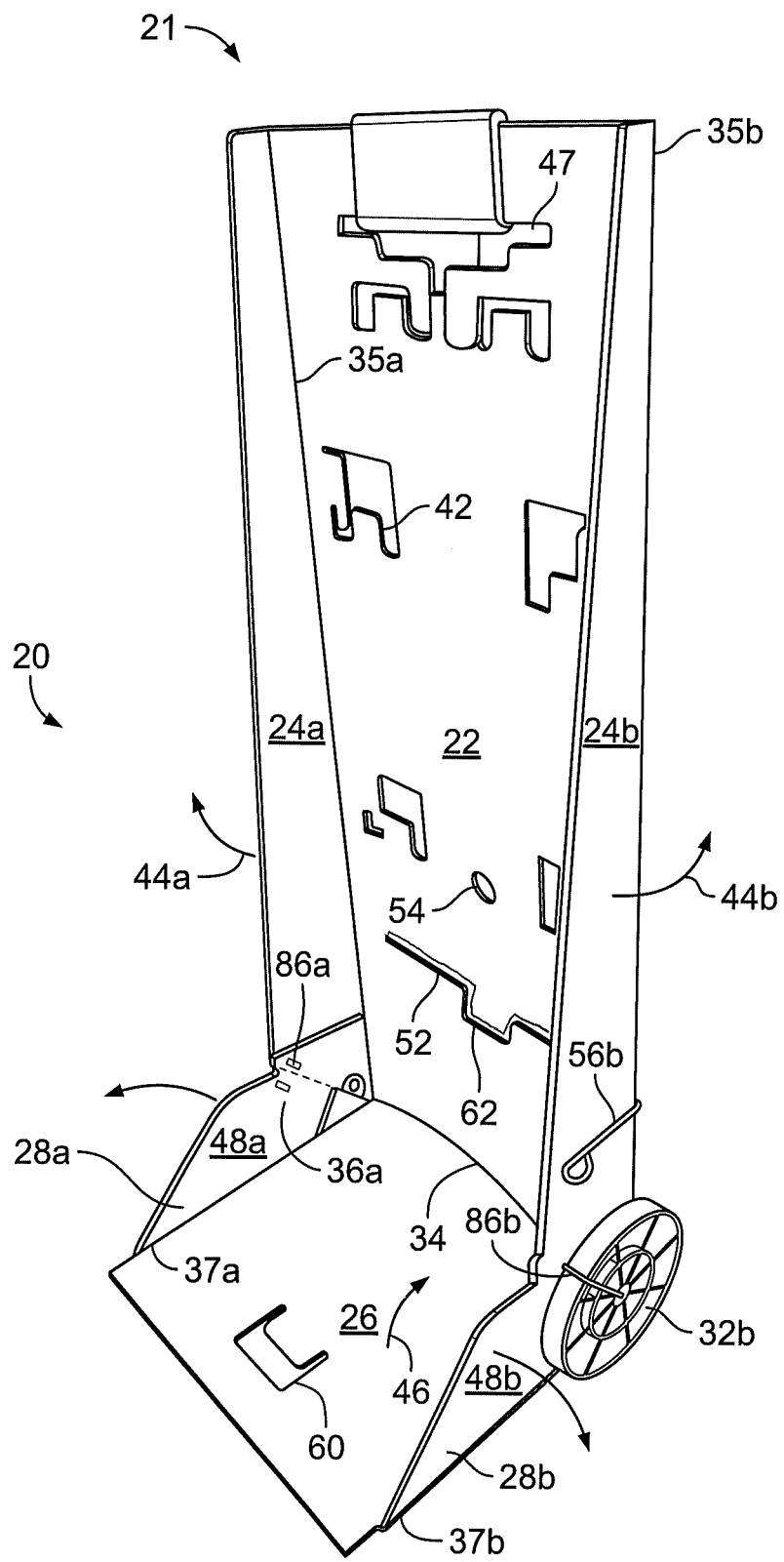
FIG. 1 is a front perspective view of an embodiment of the collapsible personal trolley of the present invention in an unfolded use configuration.
Figure 2:
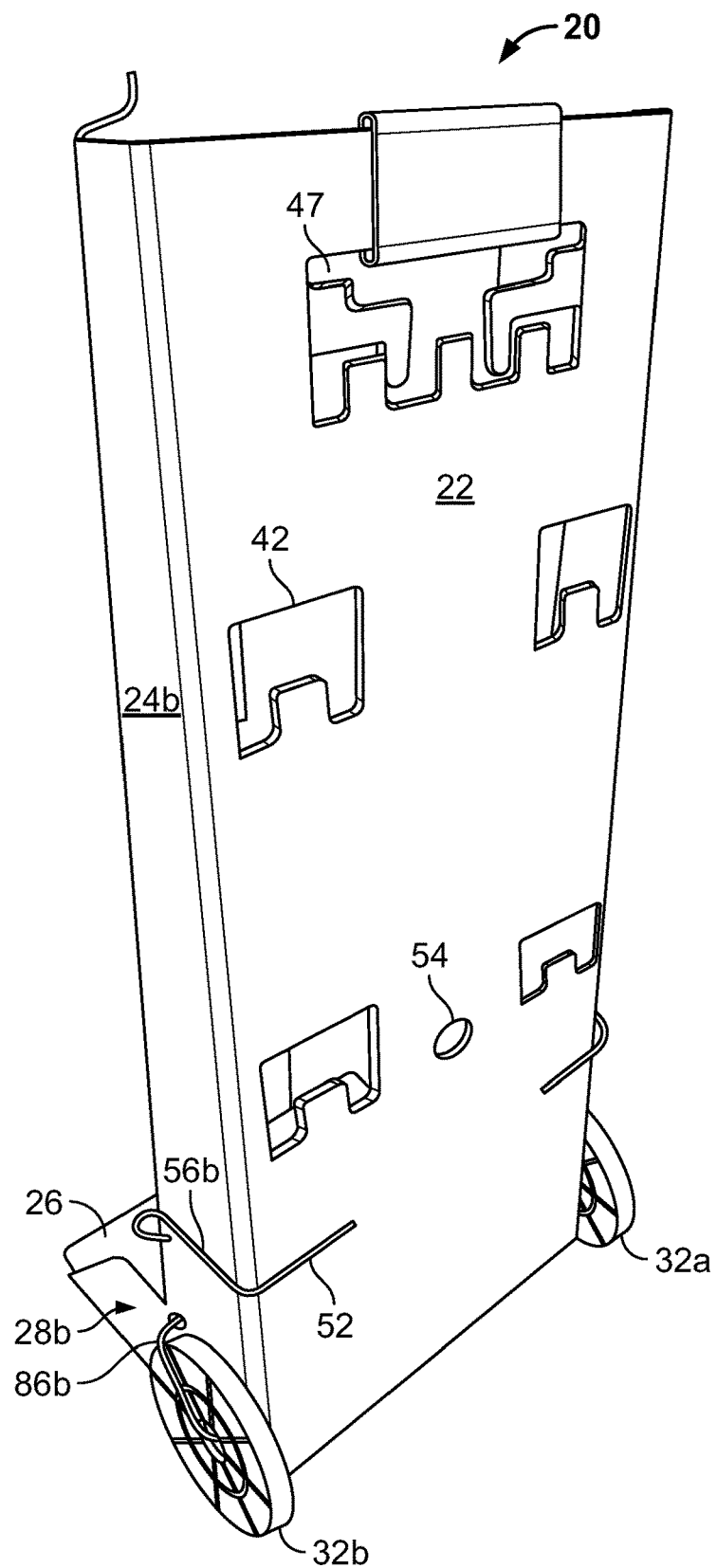
FIG. 2 is a rear perspective view of the trolley of FIG. 1.
Figure 3:
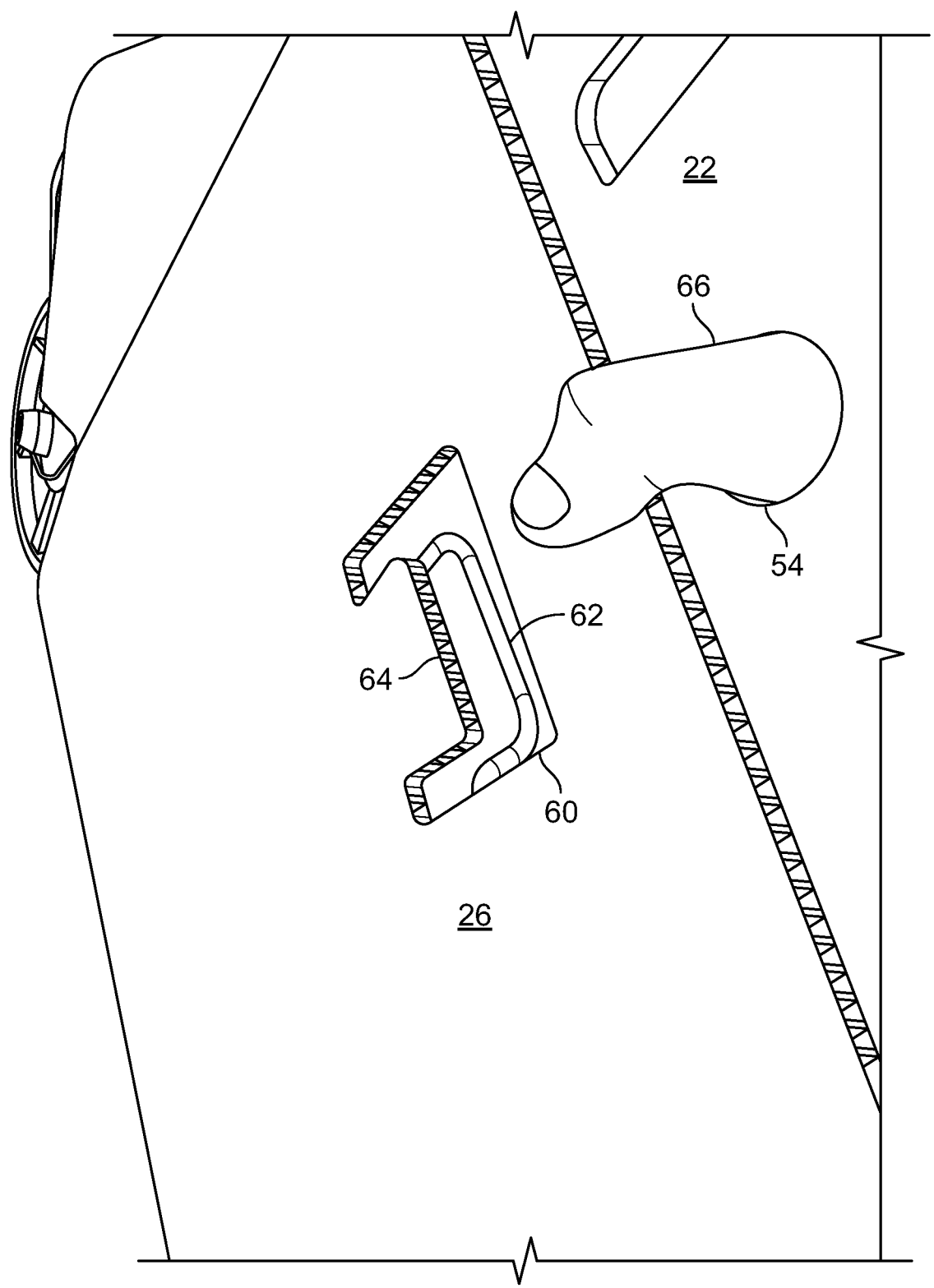
FIG. 3 is an enlarged partial front perspective view of the collapsible personal trolley of FIGS. 1 and 2 in the process of being placed in a folded storage configuration.
Figure 4:
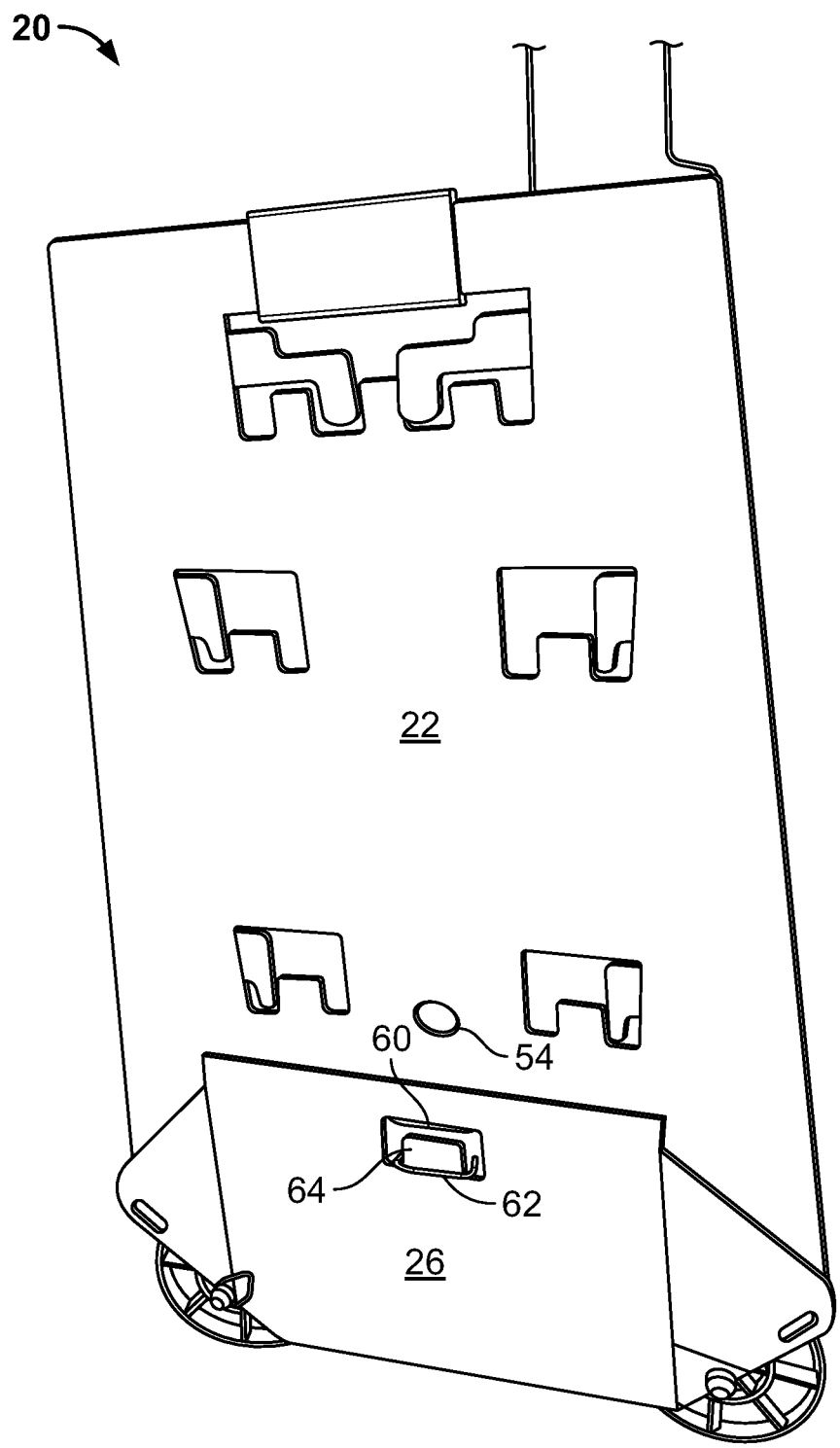
FIG. 4 is a front perspective view of the collapsible personal trolley of FIGS. 1 and 2 in a folded storage configuration.

A first embodiment of the collapsible personal trolley of the invention is indicated in general at 20 in FIGS. 1, 2, 6 and 7. As illustrated in FIGS. 1, 4 and 8, the trolley includes a body, indicated in general at 21, that includes a back panel 22, back wings 24a and 24b, a shelf panel 26 and shelf wings 28a and 28b. Wheels (two) are mounted to the bottom rear portion of the back wings 24a and 24b. The left wheel is indicated at 32b in FIGS. 1-3, while the right wheel, not visible in FIGS. 1 and 2, is indicated at 32a in FIG. 3. In alternative embodiments, the wheels may be mounted to the shelf wings 28a and 28b, the shelf panel 26 or the back panel 22.

The body 21 is preferably constructed from a single piece of corrugated plastic material, but any substantially rigid lightweight sheet material (that is preferably foldable) may be used including, but not limited to, corrugated cardboard, fiberglass, corrugated and non-corrugated composite materials and non-corrugated plastic. Advertising and/or attractive designs may be printed on the sheet of body material.

As illustrated in FIG. 1, a primary hinge 34 is formed at the junction of the bottom edge of the back panel 22 and the rear edge of the shelf panel 26. In addition wing-to-wing hinge 36a is formed between back wing 24a and shelf wing 28a while wing-to-wing hinge 36b is formed between back wing 24b and shelf wing 28b. Back wing hinges 35a and 35b are formed between the back panel 22 and back wings 24a and 24b, respectively. Shelf wing hinges 37a and 37b are formed between shelf panel 26 and shelf wings 28a and 28b, respectively. The hinges 34, 35a, 35b, 37a and 37b are preferably living hinges formed by a reduction in material thickness and/or folds in the cart body material, while the back wings and shelf wings are joined by wing-to-wing hinges 36a and 36b.

The trolley is shown in an unfolded use configuration in FIGS. 1 and 2. When in this configuration, a shopper may positioned bags and the like on shelf panel 26. In addition, the back panel 22 may be provided with bag-retaining cutouts, such as the ones indicated at 42 in FIGS. 1 and 2. With reference to FIG. 3, each cutout is provided with a generally rigid tab 43 from which the handle of a bag may be hung on the back panel 22. Further details regarding this feature are provided in commonly owned U.S. Pat. No. 9,566,991 to Parker, the contents of which are hereby incorporated by reference.

The shopper may transport the loaded trolley by a user grasping the top handle cutout 47 and tilting the top portion backwards at an angle so that it may be rolled along the floor or ground on wheels 32a and 32b.

With reference to FIG. 1, when the user has completed his or her shopping trip, as described in the Parker '991 patent, the bags are removed from the trolley and back wing panels 24a and 24b are pivoted outwards, as indicated by arrows 44a and 44b, about hinges 35a and 35b, respectively. Shelf panel 26 is simultaneously pivoted toward back panel 22, about hinge 34, as illustrated by arrow 46. As this occurs shelf wings 28a and 28b pivot in the directions of arrows 48a and 48b about hinges 37a and 37b, respectively.

Figure 6:
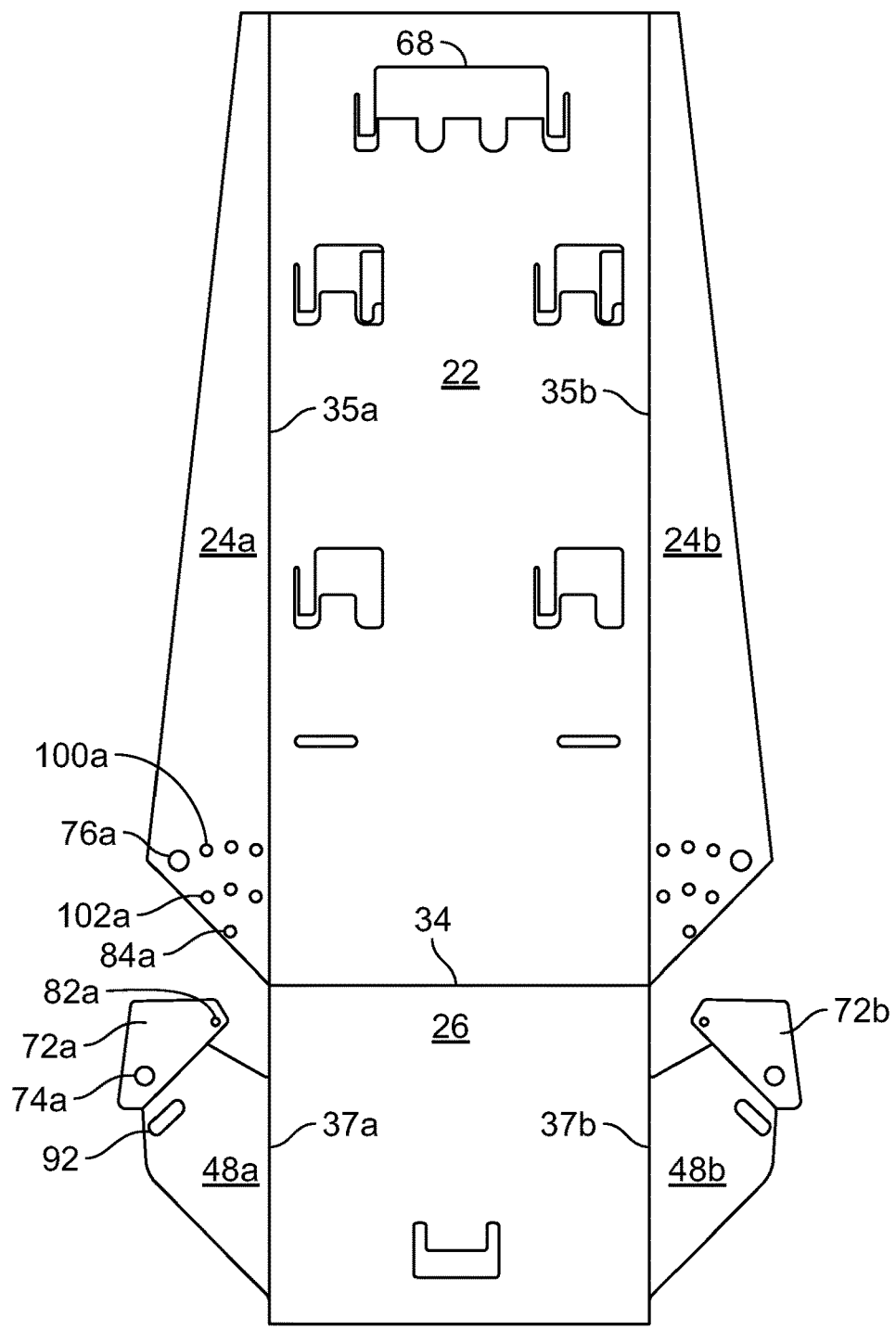
FIG. 6 is a front elevational view of a blank of material used to make the body of a second embodiment of the trolley.
Figure 7:
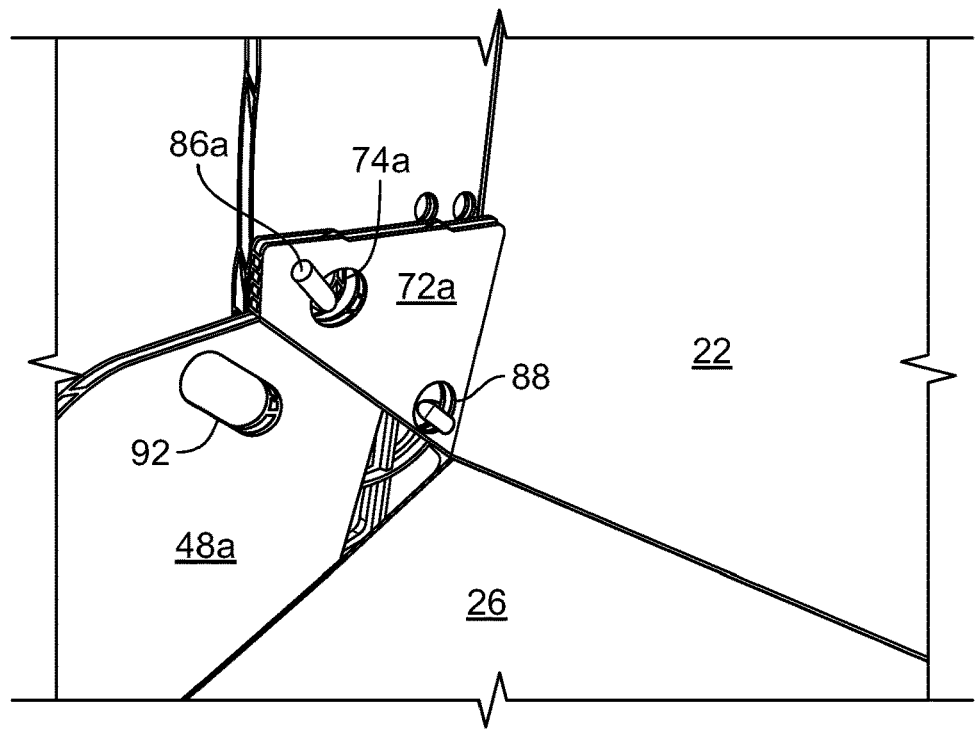
FIG. 7 is an enlarged perspective view of the wheel attachment arrangement of the trolley of FIGS. 1-5.
Figure 8:
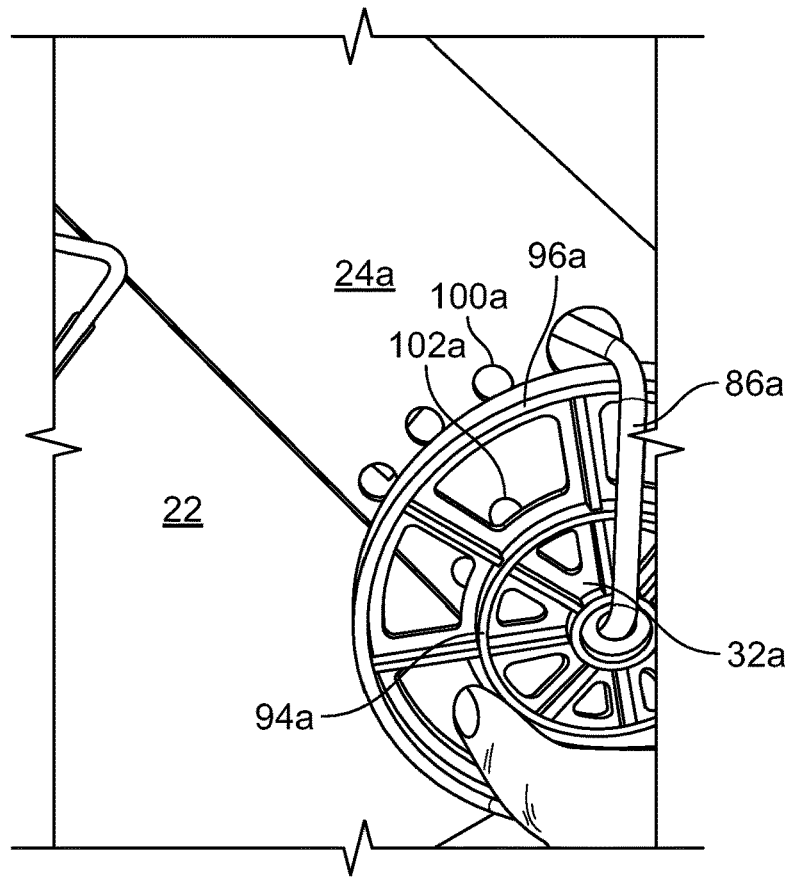
FIG. 8 is an enlarged partial view of a wheel and back wing panel of the trolley of FIGS. 1-5.

FIGS. 6 and 7 show the trolley in a folded storage position so as to be generally flat for ease of storage and transport. As described in the Parker '991 patent, in this position, shelf panel 26 is parallel to and overlays back panel 22. Shelf wing 28a similarly is parallel to and overlays back wing 24a, while shelf wing 28b is parallel to and overlays back wing 24b. Wheels 32a and 32b lie in a plane that is parallel to the plane of the back panel 22 of the trolley.

Figure 5:
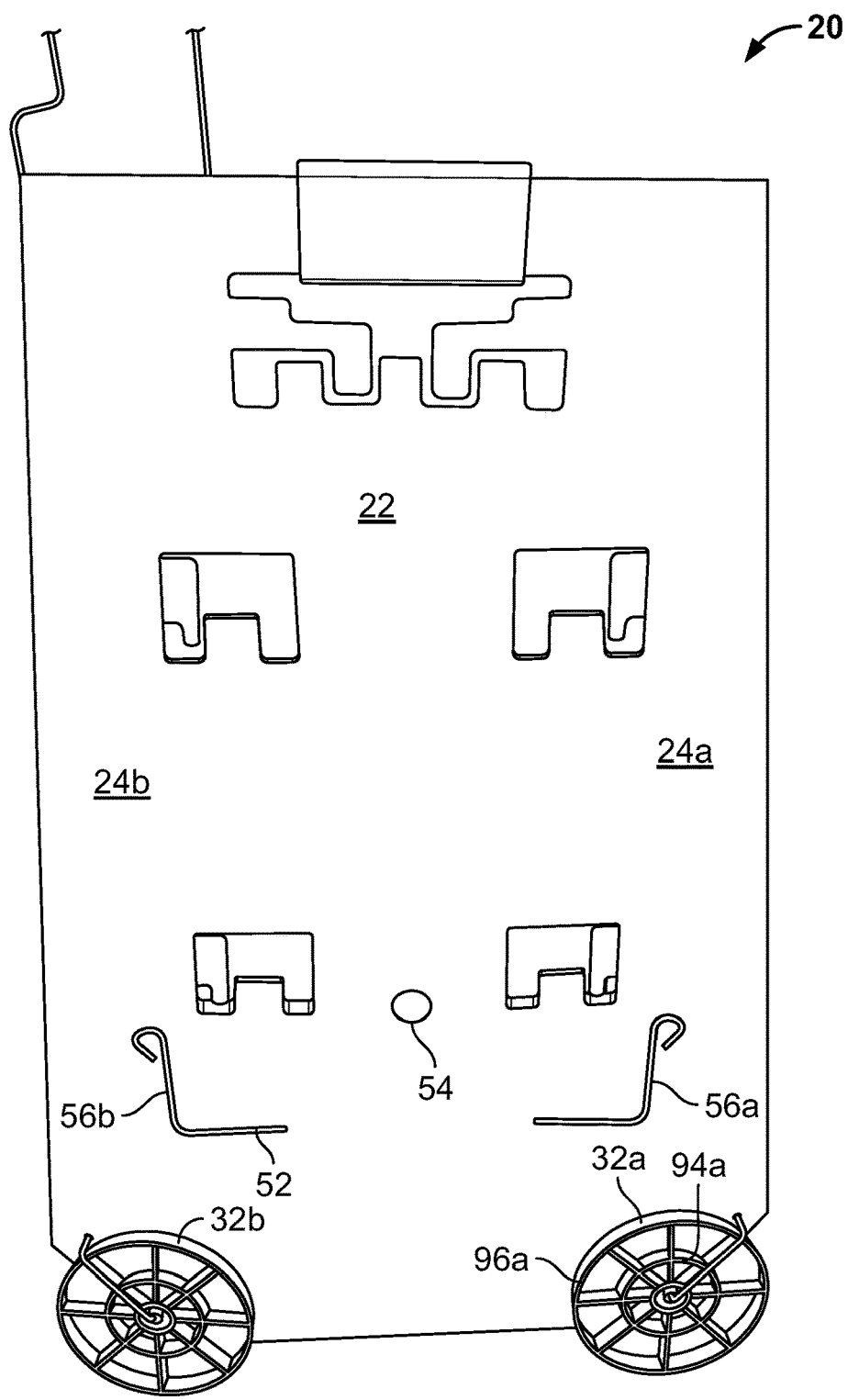
FIG. 5 is a rear perspective view of the trolley of FIG. 4.

The trolley features a pivoting brace 52 (FIGS. 1, 2 and 5) that is pivotally attached to the back panel 22 of the trolley body. More specifically, as illustrated in FIG. 5, the pivoting brace is generally U-shaped and has a pivoting axle portion with arms 56a and 56b on opposite ends. The pivoting axle portion is secured to the back of the back panel such as by passing through openings in the back panel 22.

When the trolley is in the unfolded use configuration, as illustrated in FIGS. 1 and 2, the arms 56a and 56b of the pivoting brace 52 support back wings 24a and 24b to restrict them from pivoting outwards.

As indicated in FIGS. 1, 3 and 4, the shelf panel 26 is provided with a window opening 60. In addition, the pivoting brace 52 is provided with a central offset portion 62 sized to pass through the window 60. As illustrated in FIGS. 1, 3 and 4, the window opening 60 is provided with a tab 64 that is sized to be engaged by the offset portion 62 of the latching member.

A thumb hole 54 (FIGS. 1-5) is provided in back panel 22 to aid in folding the trolley into the storage configuration (illustrated in FIGS. 4 and 5). More specifically, as illustrated in FIG. 3, a user places his or her thumb 66 through the back of the thumb opening 54. As a result, when the shelf panel 26 is folded into a position adjacent to the back panel 22, as illustrated in FIG. 3, the user may hold the shelf panel in this position using his or her thumb 66 as he or she pivots the pivoting brace 52 with his or her other hand. The latching member 52 may then be pivoted, via either lever portion 56a or 56b, into the position illustrated in FIG. 4 so that the offset portion 62 engages the tab 64 to latch the trolley in the generally flat, folded configuration for ease of storage or carrying.

When user desires to open the cart, he or she rotates the latching member 52 so that the offset portion 62 disengages from the tab 64. As a result, the trolley is free to unfold into the use configuration of FIGS. 1 and 2. Cargo may then be easily carried on the extended shelf panel 26.

Figure 13:
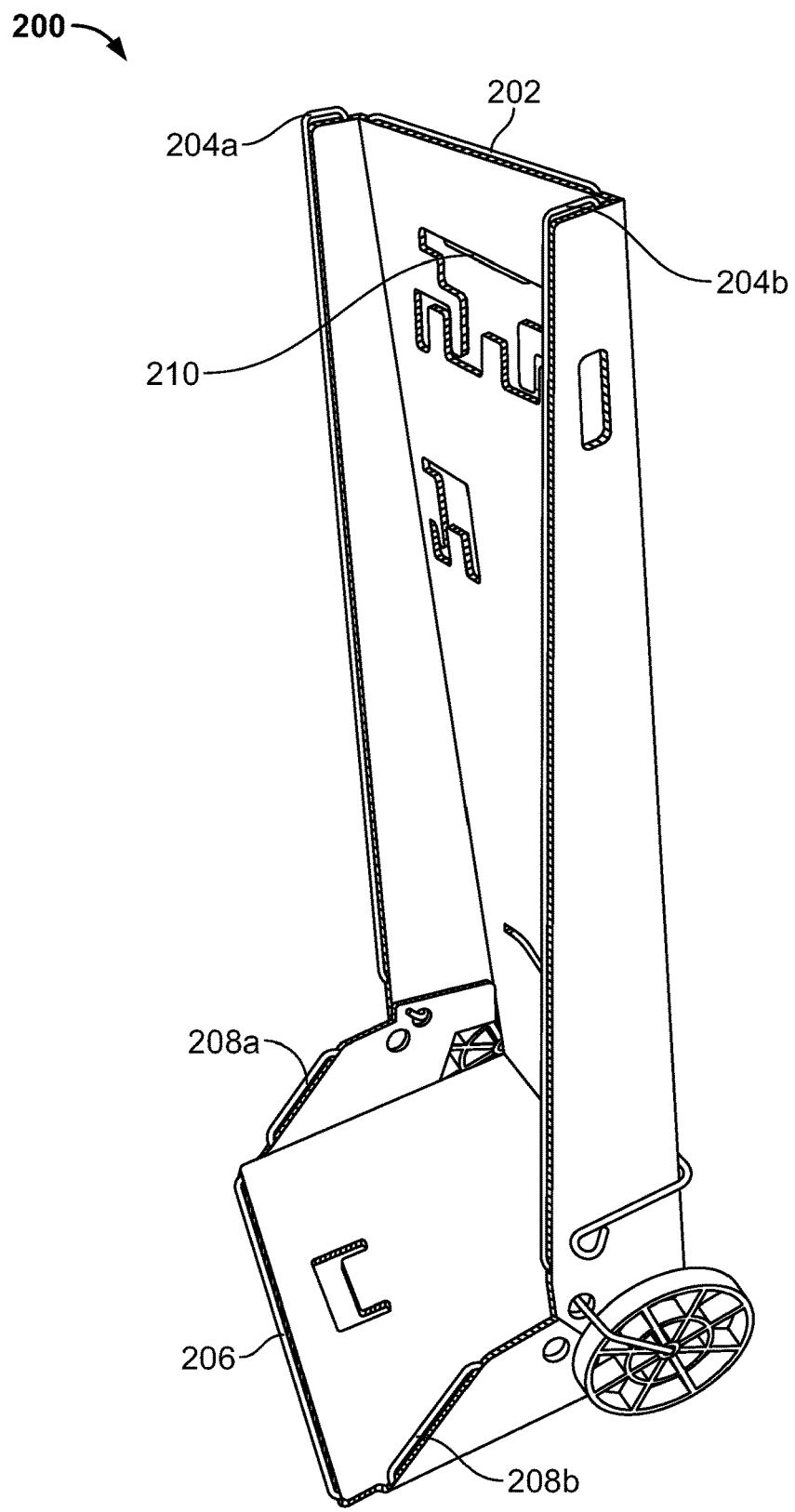
FIG. 13 is a perspective view of an alternative embodiment of the trolley of the invention in an unfolded used configuration.

An example of a blank used to form a body in a second embodiment of the collapsible trolley is shown in FIG. 13. Other than the configuration of the cutouts 68, the trolley body formed by the blank of FIG. 6 is identical to the trolley illustrated in FIGS. 1-5. As a result, the panels are illustrated with the same reference numbers. The panels are folded about fold lines 35a, 35b, 34 and 37a, 37b to form the cart body 21 of FIGS. 1-5.

Panels 72a and 72b of FIG. 6 are joined to the bottom portions of wing panels 24a and 24b to form the body of the trolley (21 in FIG. 1). This is accomplished using the wheel brackets of the trolley. More specifically, with reference to panel 72a of FIG. 6, and after folding of the blank about lines 34, 35a and 37a of FIG. 6, wheel bracket top opening 74a is positioned in alignment with wheel bracket top opening 76a, while wheel bracket bottom opening 82a is positioned in alignment with wheel bracket bottom opening 84a. Panel 72b is similarly positioned.

Wheel brackets, indicated at 86a and 86b (FIGS. 1 and 2) secure the wheels 32a and 32b to the trolley body, as described in the Parker '991 patent. With reference to FIG. 7, the top end portion of the wheel bracket 86a passes through the aligned wheel bracket top openings 74a and 76a of FIG. 6 and is bent, while the bottom end portion of the wheel bracket 86a passes through the aligned wheel bracket bottom openings 82a and 84a of FIG. 6 and is provided with retainer 88. As a result, the bottom portion of wing panel 24a (FIG. 6) is secured to panel 72a. Wing panel 24b (FIG. 6) is secured to panel 72b in a similar fashion. As shown in FIGS. 6 and 7, shelf wing panel 48a is provided with elongated opening 92 which receives the bent top end of the wheel bracket when the trolley is in the folded configuration (FIGS. 4 and 5). Shelf wing panel 48b is similarly configured.

As shown in FIGS. 5 and 8, wheel 32a, which preferably is formed from molded plastic, includes concentric hub rim 94a and edge rim 96a, which preferably includes a rounded or tapered profile. Wheel 32b features a similar construction. Side loads are resisted by the hub and edge rims on the inner face of each wheel rubbing on the plane surface of the corresponding back wings 24a and 24b. With reference to FIGS. 6 and 8, back wing 24a is provided with an arcuate series of openings 102a and 100a which are traversed by the inner faces of the hub and edge rims 94a and 96a, respectively as the wheel 32a turns. This reduces wheel surface contact area with respect to the back wing 24a and thus minimizes the resistance to rolling. Wheel 32b and back wing panel 24b features a similar configuration.

Figure 9:
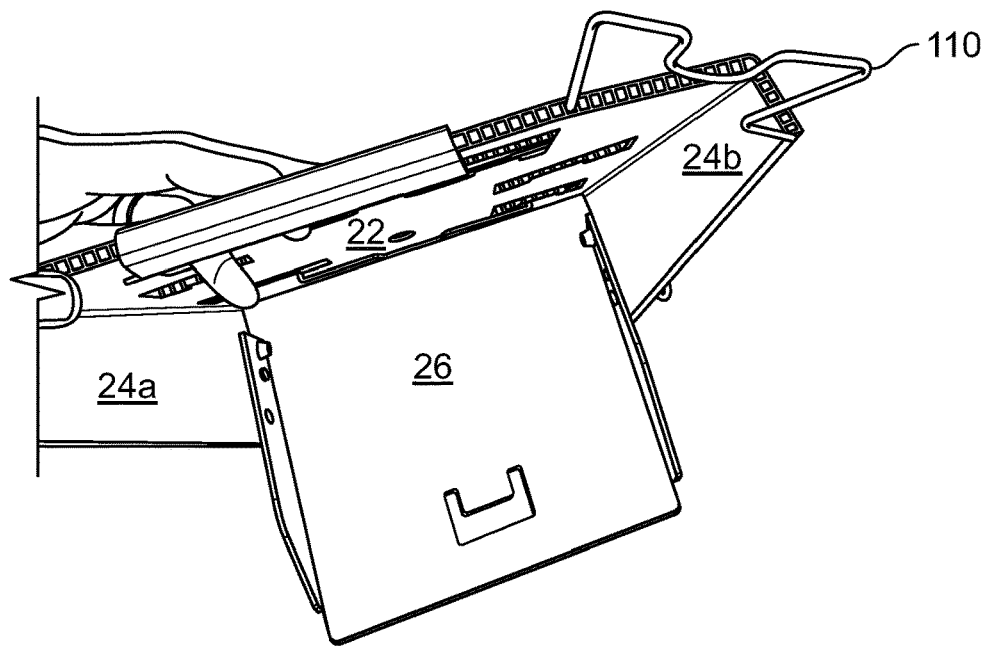
FIG. 9 is a top perspective view of the trolley of FIGS. 1 and 2.
Figure 10:
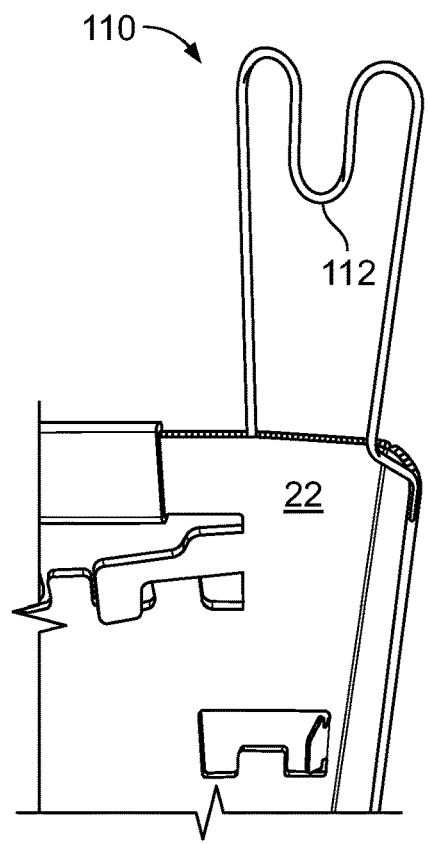
FIG. 10 is an enlarged perspective view of the clothing hook of FIG. 9.

As illustrated in FIGS. 9 and 10, a wire clothes bracket 110 may be mounted to the top edge of the back panel 22 by removably inserting the bottom ends of the bracket into the corrugations of the panel. The bracket 110 may include any number of U-shape portions 112, or similar formations, such as a stair-step profile, to provide an engagement location for clothes hangers. As a result, clothing, such as dry cleaning or retail purchases, may be hung on the trolley so as to drape next to the back panel 22. As illustrated in FIGS. 9 and 10, the clothes bracket may extend between the back panel 22 and a back wing panel (such as 24b), when the trolley is in the unfolded use configuration, to increase structural rigidity of the bracket and trolley.

Figure 11:
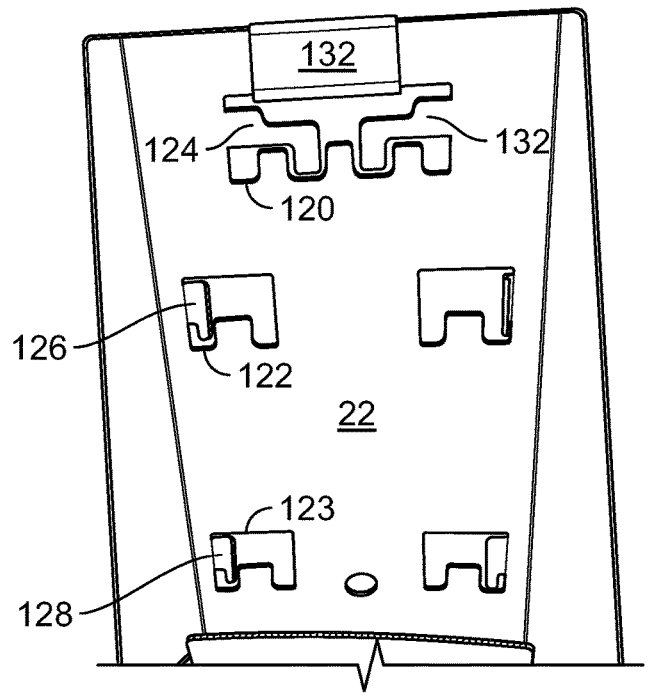
FIG. 11 is an enlarged rear perspective view of the back panel of the trolley of FIGS. 1 and 2.
Figure 12:
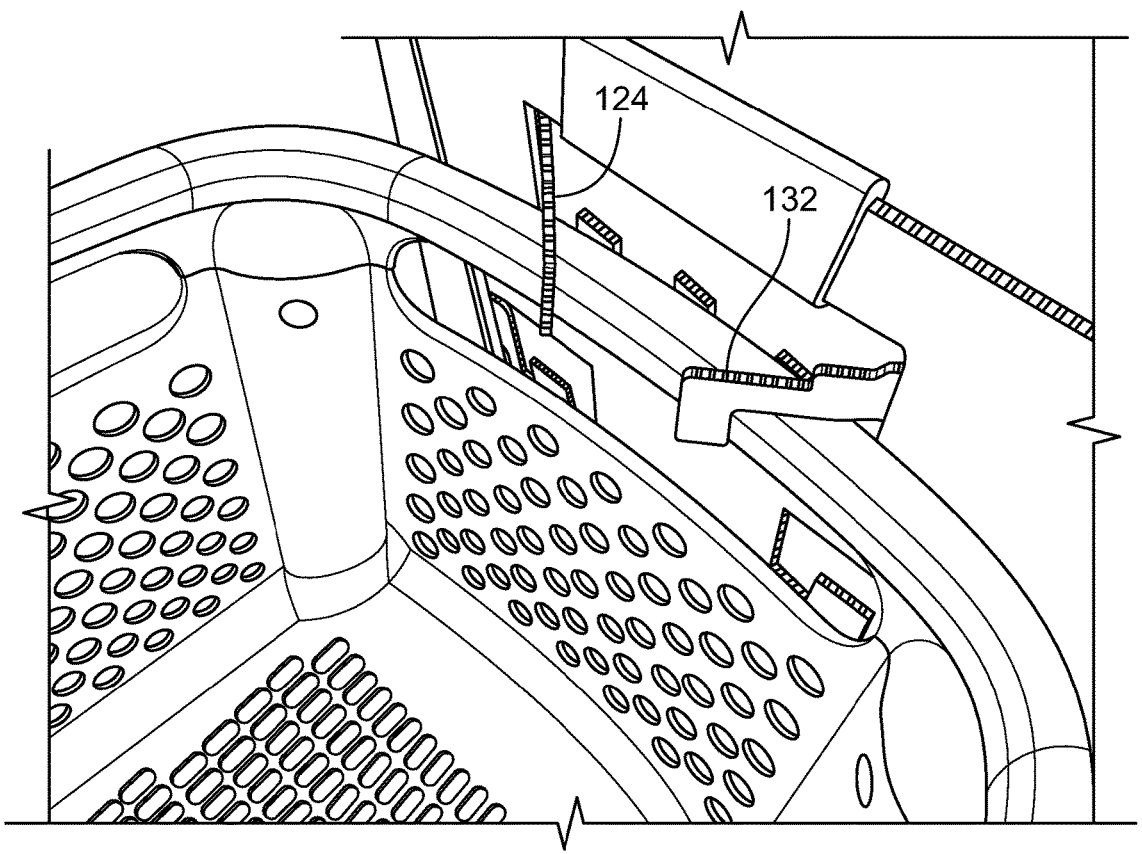
FIG. 12 is an enlarged partial perspective view illustrating use of the hitchhiker hooks of the trolley of FIGS. 1 and 2

With reference to FIG. 11, back panel 22 cutouts 120, 122 and 123 are provided with hitchhiker tabs 124, 126 and 128, respectively. The hitchhiker tabs fold into positions that are generally perpendicular to the back panel 22 and form downward-facing hooks whereby the trolley may be suspended from a horizontal side wall wire or plastic wall of a traditional shopping cart. As a result, the collapsible trolley may be hung on the side or of the shopping cart, as illustrated in FIG. 12 while the user is shopping in a store.

With reference to FIG. 11, the top edge of cutout 120 forms a handle for carrying, pushing or pulling the trolley. As indicated at 132, a small sheet of corrugated material, or other foldable material, may be wrapped around the top edges of the cutout 120 and back panel 22 to strengthen the handle and make the handle more comfortable to grip.

Figure 14:
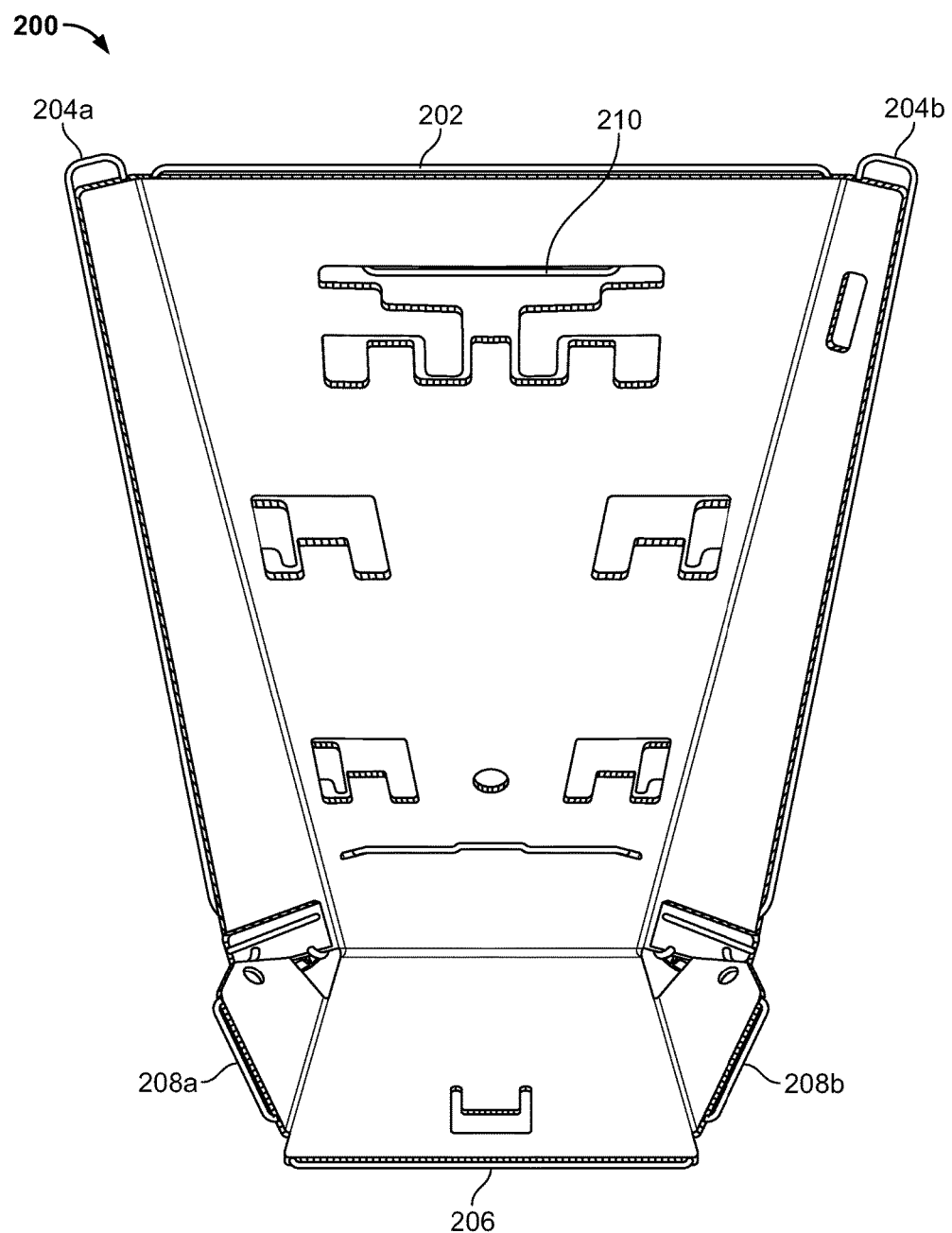
FIG. 14 is a perspective view of the trolley of FIG. 13 in a partially folded configuration.

In an alternative embodiment of the collapsible personal trolley of the invention, indicated in general at 200 in FIGS. 13 and 14, the edges of the back panel, back wings, shelf panel and shelf wings are provided with wire sections 202, 204a and 204b, 206 and 208a and 208b, respectively, to improve the appearance of the trolley and to add structural support to the panels. In addition, the upper edge of the opening defining the handle opening in the back panel is provided with wire section 210 for strength and to provide the user with a more comfortable grip.

Each wire section 202, 204a and 204b, 206, 208a and 208b and 210 is provided with opposing end portions that form generally 90° angles with the primary intermediate portion. The end portions thus may be inserted into the corrugations of the corresponding panel to secure the wire section on the edge of the corresponding panel. The end portions may optionally be provided with adhesive prior to insertion into the panel corrugations. Alternative methods for securing the wire sections may be used including, but not limited to, fasteners or adhesive.

While the preferred embodiments of the invention have been shown and described, it will be apparent to those skilled in the art that changes and modifications may be made therein without departing from the spirit of the invention, the scope of which is set forth in the following claims.

What is claimed is:

1. A collapsible trolley comprising;
 a) a body including:
  i. a back panel including a hitchhiker tab;
  ii. a shelf panel pivotally attached to a bottom edge of the back panel;
  iii. a pair of back wing panels pivotally attached one each to opposing side edges of the back panel;
  iv. a pair of shelf wing panels pivotally attached one each to opposing side edges of the shelf panel and one each to bottom edges of the pair of back wing panels;
 b) said body movable between an unfolded use configuration, where the pair of back wing panels, pair of shelf wing panels and the shelf panel are all generally at an angle of approximately 90° with respect to the back panel so that the pair of back wing panels and the pair of shelf wing panels cooperate to support the shelf panel, and a folded storage configuration where the pair of back wing panels are generally in the same plane as the back panel, the pair of shelf wing panels are generally in the same plane as the shelf panel, the shelf panel overlays a portion of the back panel and the shelf wing panels overlay portions of the back wing panels;
 c) a latching member attached to the body and adapted to secure the body in the folded storage configuration;
 d) a first wheel having an edge rim;
 e) a first wheel bracket attached to a first one of the pair of back wing panels and having a generally vertical abutment portion sized to traverse a radius of the first wheel so that the first wheel is trapped between the first back wing panel and the vertical abutment portion of the first wheel bracket, and wherein the first back wing panel has an arcuate series of openings that align with an edge rim of the first wheel;
 f) a second wheel having an edge rim; and
 g) a second wheel bracket attached to a second one of the pair of back wing panels and having a generally vertical abutment portion sized to traverse a radius of the second wheel so that the second wheel is trapped between the second back wing panel and the vertical abutment portion of the second wheel bracket, and wherein the second back wing panel has an arcuate series of openings that align with an edge rim of the second wheel.

2. The collapsible trolley of claim 1 further comprising a thumb hole formed in the back panel.

3. The collapsible trolley of claim 1 wherein each of the first and second wheels includes a hub rim and wherein each of the first and second back wing panels has a second arcuate series of openings that align with a hub rim of a corresponding first or second wheel.

4. The collapsible trolley of claim 1 wherein the first and second wheel brackets are formed from wire.

5. The collapsible trolley of claim 4 wherein each of the first and second wheel brackets has an upper end and a lower end that engages a corresponding back wing panel and an adjacent corresponding shelf wing panel so as to attach the corresponding back and shelf wing panels together.

6. The collapsible trolley of claim 1 wherein each of the first and second wheel brackets has an upper end and a lower end that engages a corresponding back wing panel and an adjacent corresponding shelf wing panel so as to attach the corresponding back and shelf wing panels together.

7. The collapsible trolley of claim 1 further comprising an accessory clothing bracket that is attached to a top edge of the back panel.

8. The collapsible trolley of claim 7 wherein the body is formed from corrugated material and further the accessory bracket includes a pair of bottom end portions that engage the corrugations of the material.

9. The collapsible trolley of claim 8 wherein the accessory bracket is formed from wire.

10. The collapsible trolley of claim 9 wherein one of the bottom end portions of the wire accessory bracket is inserted into a top edge of the back panel and the other bottom end portion of the accessory bracket is inserted into a top edge of one of the pair of back wing panels.

11. The collapsible trolley of claim 9 wherein the pair of bottom end portions slidably engage the corrugations.

12. The collapsible trolley of claim 9 wherein the pair of bottom end portions removably engage the corrugations.

13. The collapsible trolley of claim 8 wherein one of the bottom end portions of the accessory bracket is inserted into a top edge of the back panel and the other bottom end portion of the accessory bracket is inserted into a top edge of one of the pair of back wing panels.

14. The collapsible trolley of claim 1 wherein the body is constructed from a single-piece of corrugated plastic material.

15. The collapsible trolley of claim 1 wherein the back panel is provided with a hitchhiker tab with a downward-facing hook portion.

16. The collapsible trolley of claim 15 wherein the hitchhiker tab is integrally formed with the back panel and foldable with respect to the back panel between a use position and storage position.

17. The collapsible trolley of claim 1 further comprising a plurality of hitchhiker tabs configured to engage shopping cart sidewalls having a variety of thicknesses.

18. The collapsible trolley of claim 17 wherein each of the plurality of hitchhiker tabs is integrally formed with the back panel and foldable with respect to the back panel between a use position and storage position.

19. The collapsible personal trolley of claim 1 further comprising a plurality of wire sections positioned one each on edges of the back wing panels, the shelf wing panels, the shelf panel and the back panel.

20. The collapsible personal trolley of claim 19 wherein the body is formed from corrugated material and each of the plurality of wire sections include angled end portions that engage corrugations of a corresponding panel.

* * * * *